(12) United States Patent
Lee et al.

(10) Patent No.: US 12,438,777 B2
(45) Date of Patent: *Oct. 7, 2025

(54) METHOD AND APPARATUS FOR PROVIDING SERVICE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

This patent is subject to a terminal disclaimer.

(21) Appl. No.: 17/972,081

(22) Filed: Oct. 24, 2022

(65) Prior Publication Data

US 2023/0037559 A1   Feb. 9, 2023

Related U.S. Application Data

(63) Continuation of application No. 17/135,229, filed on Dec. 28, 2020, now Pat. No. 11,516,859.

(30) Foreign Application Priority Data

Jan. 2, 2020   (KR) .................. 10-2020-0000452
Feb. 18, 2020  (KR) .................. 10-2020-0019863

(51) Int. Cl.
*H04L 41/0894* (2022.01)
*H04W 4/50* (2018.01)
(Continued)

(52) U.S. Cl.
CPC ........... *H04L 41/0894* (2022.05); *H04W 4/50* (2018.02); *H04W 48/16* (2013.01); *H04W 76/12* (2018.02)

(58) Field of Classification Search
CPC .......................... H04W 48/16; H04L 41/0894
See application file for complete search history.

(56) References Cited

U.S. PATENT DOCUMENTS

| 10,659,952 B2 | 5/2020 | Wang et al. |
| 11,490,326 B2 | 11/2022 | Yu et al. |

(Continued)

FOREIGN PATENT DOCUMENTS

| CN | 109219111 A | 1/2019 |
| CN | 109982415 A | 7/2019 |

(Continued)

OTHER PUBLICATIONS

ZTE, Clarification on Policy Control Request Triggers, S2-1912280, 3GPP TSG-SA WG2 Meeting #136, Reno, USA, Nov. 22, 2019.
(Continued)

*Primary Examiner* — Fabricio R Murillo Garcia
(74) *Attorney, Agent, or Firm* — Jefferson IP Law, LLP

(57) ABSTRACT

A method performed by an access and mobility management function (AMF) in a wireless communication is provided. The method includes transmitting, to a policy control function (PCF), a policy create request message including first allowed network slice selection assistance information (NSSAI), receiving, from the PCF, a policy create response message including first session management function (SMF) selection management information, in a case that an establishment of a first protocol data unit (PDU) session is requested from a terminal, establishing the first PDU session based on the first SMF selection management information, in a case that the first NSSAI is changed, transmitting, to the PCF, a policy update request message including second allowed NSSAI based on the policy control request trigger,
(Continued)

and receiving, from the PCF, a policy update response message including second SMF selection management information.

9 Claims, 10 Drawing Sheets

(51) Int. Cl.
*H04W 48/16* (2009.01)
*H04W 76/12* (2018.01)

(56) References Cited

U.S. PATENT DOCUMENTS

| | | |
|---|---|---|
| 2018/0332523 A1 | 11/2018 | Faccin et al. |
| 2019/0059067 A1 | 2/2019 | Lee et al. |
| 2019/0166467 A1 | 5/2019 | Livanos et al. |
| 2019/0313359 A1 | 10/2019 | Lee et al. |
| 2019/0335392 A1 | 10/2019 | Qiao et al. |
| 2019/0380104 A1 | 12/2019 | Vrzic et al. |
| 2019/0387576 A1 | 12/2019 | Yang et al. |
| 2020/0221541 A1 | 7/2020 | Yan |
| 2021/0160770 A1 | 5/2021 | Zhu et al. |
| 2022/0078870 A1 | 3/2022 | Park et al. |
| 2022/0167446 A1* | 5/2022 | Youn ............... H04W 76/16 |
| 2022/0264503 A1* | 8/2022 | Starsinic ............... H04L 63/08 |
| 2022/0272620 A1* | 8/2022 | Ninglekhu ............ H04W 40/02 |

FOREIGN PATENT DOCUMENTS

| | | |
|---|---|---|
| CN | 110603851 A | 12/2019 |
| EP | 3 496 465 A1 | 6/2019 |
| EP | 3 806 537 A1 | 4/2021 |
| WO | 2018/231028 A1 | 12/2018 |
| WO | 2019/228434 A1 | 12/2019 |
| WO | 2021/119627 A1 | 6/2021 |

OTHER PUBLICATIONS

Chinese Notice of Allowance dated Jul. 2, 2024, issued in Chinese Application No. 202080091626.1.
European Notice of Allowance dated Jun. 12, 2023, issued in European Application No. 20217445.4.
"3rd Generation Partnership Project; Technical Specification Group Services and System Aspects; Procedures for the 5G System; Stage 2 (Release 15)", 3GPP TS 23.502 V15.8.0 (Dec. 2019), XP051867064, Dec. 22, 2019.
"3GPP; TSG SA; Procedure for the 5G System (5GS); Stage 2 (Release 16)", 3GPPS TS 23.502 V16.3.0, Dec. 22, 2019.
"3GPP; TSG SA; Study on Enhancement of Network Slicing (Release 16)", 3GPP TR 23.740 V16.0.0, Dec. 19, 2018.
Extended European Search Report dated Mar. 25, 2021, issued in European Patent Application No. 20217445.4.
International Search Report dated Apr. 5, 2021, issued in International Patent Application No. PCT/KR2020/019193.
European Notice of Allowance dated Jul. 10, 2025, issued in European Application No. 20217445.4.

* cited by examiner

METHOD AND APPARATUS FOR PROVIDING SERVICE IN WIRELESS COMMUNICATION SYSTEM

CROSS-REFERENCE TO RELATED APPLICATION(S)

This application is a continuation application of prior application Ser. No. 17/135,229, filed on Dec. 28, 2020, which is based on and claims priority under 35 U.S.C. § 119(a) of a Korean patent application number 10-2020-0000452, filed on Jan. 2, 2020, in the Korean Intellectual Property Office, and of a Korean patent application number 10-2020-0019863, filed on Feb. 18, 2020, in the Korean Intellectual Property Office, the disclosure of each of which is incorporated by reference herein in its entirety.

BACKGROUND

1 Field

The disclosure relates to a method and apparatus for providing services in a wireless communication system. More particularly, the disclosure relates to a method and apparatus for providing a service requested by a user equipment in a mobile communication system.

2 Description of the Related Art

To meet the demand with respect to ever-increasing wireless data traffic after the commercialization of the $4^{th}$ generation (4G) communication system, there have been efforts to develop an advanced $5^{th}$ generation (5G) or pre-5G communication system. For this reason, the 5G or pre-5G communication system is also called a beyond $4^{th}$-generation (4G) network communication system or post long term evolution (LTE) system. Implementation of the 5G communication system using ultra-frequency (millimeter wave (mmWave)) bands, e.g., 60 giga hertz (GHz) bands, is considered to attain higher data transfer rates. To reduce propagation loss of radio waves and increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid frequency shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, and machine type communication (MTC) for connection between things are being studied. Such an IoT environment may provide intelligent Internet technology services that create new values to human lives by collecting and analyzing data generated from things connected. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

With the development of the aforementioned technologies and wireless communication systems, it is possible to provide various services, and there is a need for a method to provide the services smoothly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively providing a service in a wireless communication system.

Additional aspects will be set forth in part in the description which follows and, in part, will be apparent from the description, or may be learned by practice of the presented embodiments.

In accordance with an aspect of the disclosure, a method performed by an access and mobility management function (AMF) in a wireless communication is provided. The method includes transmitting, to a policy control function (PCF), a policy create request message including first allowed network slice selection assistance information (NS-SAI), receiving, from the PCF, a policy create response message including first session management function (SMF) selection management information, wherein the first SMF selection management information is generated based on the first allowed NSSAI, and wherein the policy create response message includes a policy control request trigger, in a case that an establishment of a first protocol data unit (PDU) session is requested from a terminal, establishing the first PDU session based on the first SMF selection management information, in a case that the first allowed NSSAI is changed, transmitting, to the PCF, a policy update request message including second allowed NSSAI based on the policy control request trigger, and receiving, from the PCF, a policy update response message including second SMF selection management information, wherein the second SMF selection management information is generated based on the second allowed NSSAI.

In accordance with another aspect of the disclosure, a method performed by a policy control function (PCF) in a wireless communication is provided. The method includes receiving, from an access and mobility management function (AMF), a policy create request message including first allowed network slice selection assistance information (NSSAI), transmitting, to the AMF, a policy create response message including first session management function (SMF) selection management information, wherein the first SMF selection management information is generated based on the first allowed NSSAI, and wherein the policy create response message includes a policy control request trigger, wherein a first protocol data unit (PDU) session is established based on the first SMF selection management information, in a case that the first allowed NSSAI is changed, receiving, from the AMF, a policy update request message including second allowed NSSAI, wherein the policy update request message is transmitted from the AMF to the PCF based on the policy control request trigger, and transmitting, to the AMF, a policy update response message including second SMF selection management information, wherein the second SMF selection management information is generated based on the second allowed NSSAI.

In accordance with another aspect of the disclosure, an access and mobility management function (AMF) in a wireless communication is provided. The AMF includes a transceiver, and at least one processor configured to transmit, via the transceiver, to a policy control function (PCF), a policy create request message including first allowed network slice selection assistance information (NSSAI), receive, via the transceiver, from the PCF, a policy create response message including first session management function (SMF) selection management information, wherein the first SMF selection management information is generated based on the first allowed NSSAI, and wherein the policy create response message includes a policy control request trigger, in a case that an establishment of a first protocol data unit (PDU) session is requested from a terminal, establish the first PDU session based on the first SMF selection management information, in a case that the first allowed NSSAI is changed, transmit, via the transceiver, to the PCF, a policy update request message including second allowed NSSAI based on the policy control request trigger, and receive, via the transceiver, from the PCF, a policy update response message including second SMF selection management information, wherein the second SMF selection management information is generated based on the second allowed NSSAI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
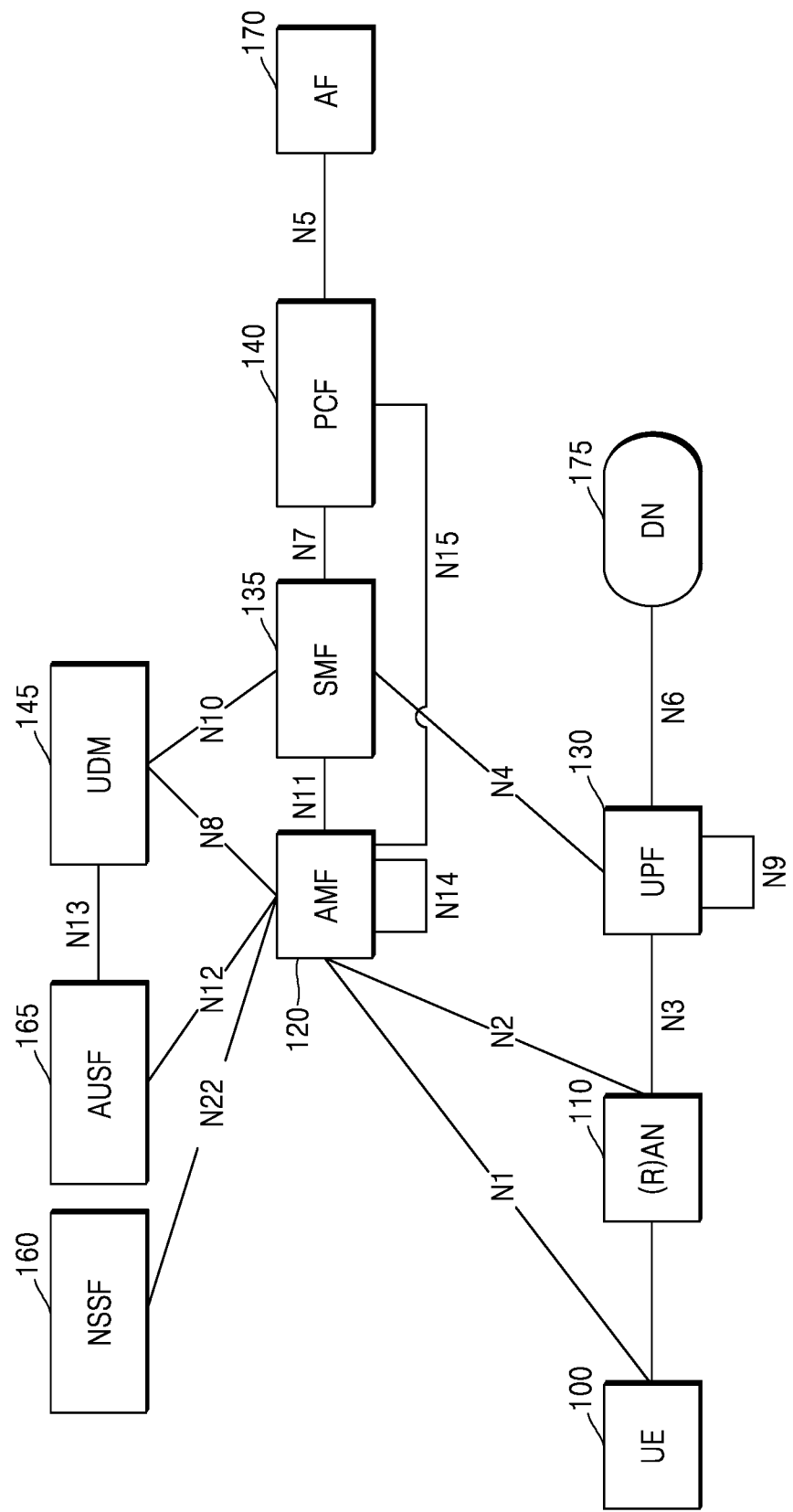
FIG. 1 shows a network architecture of a $5^{th}$ generation system (5GS), according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments of the disclosure, the module may include one or more processors.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the $3^{rd}$ generation partnership project (3GPP) long term evolution (LTE) will be used hereinafter. The disclosure is not, however, limited to the terms and definitions, and may equally apply to any systems that conform to other standards. In particular, the disclosure may be applied to the 3GPP new radio (NR) (which is the $5^{th}$ generation (5G) mobile communication standard). In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

In the following description, a base station is an entity for performing resource allocation for a terminal, and may be at least one of a gNB, an eNB, a Node B, a base station (BS), a radio access unit, a base station controller, or a node on a network. The terminal may include a UE, an MS, a cellular phone, a smart phone, a computer, or a multimedia system capable of performing a communication function. The disclosure is not limited thereto.

The term 'service' may be interchangeably used with a service performed by a certain communication equipment (or network function (NF)) at the request of another communication equipment (or another NF) (i.e., an NF service), a service provided by a mobile network operator (i.e., a voice service, a text service, a data service, etc.), or a service provided by an over-the-top (OTT) operator (i.e., a messenger service, a game service, etc.).

The mobile communication system may provide UE attachment, registration, and session connection (or public data network (PDN) connection, protocol data unit (PDU) session) for providing a service. For this, a protocol may be defined between the UE and an NF in the mobile communication system, in which case the UE and the NF may exchange various parameters defined in a control plane signaling protocol.

In embodiments of the disclosure, when the parameter (e.g., data network name (DNN), single NSSAI (S-NSSAI), or the like) transmitted by the UE to the NF is not valid or may not be provided in the mobile communication system (e.g., $5^{th}$ generation system (5GS), evolved packet system (EPS), or the like), the parameter transmitted by the UE may be replaced with an available parameter instead of rejecting the request of the UE or releasing the session, thereby preventing service errors or customer service quality degradation.

FIG. 1 shows a network architecture of a 5GS, according to an embodiment of the disclosure.

Referring to FIG. 1, a 5G core network may include an access and mobility management function (AMF) 120, a user plane function (UPF) 130, a session management function (SMF) 135, a policy control function (PCF) 140, a unified data management (UDM) 145, a network slice selection function (NSSF) 160, an authentication server function (AUSF) 165, and the like. The UE 100 may be connected to the 5G core network through a BS 110 (denoted as (R)AN or RAN throughout the drawings). The UE 100 may also be referred to as a terminal and the BS 110 may be referred to as an (R)AN or RAN. The 5G core network may further include an application function (AF) 170 and a data network (DN) 175.

In an embodiment of the disclosure, the AMF 120 is an NF that manages access and mobility to a wireless network for the UE 100. The SMF 135 is an NF that manages a session for the UE 100, and session information may include a quality of service (QoS) information, charging information, or information about packet processing. The UPF 130 is an NF that handles user plane traffic under the control of the SMF 135. The PCF 140 is an NF that manages an operator policy to provide services in the wireless communication system. The UDM 145 is an NF that stores and manages UE subscription data. Although not shown in FIG. 1, a unified data repository (UDR) is an NF that stores and manages data. The UDR may store the subscription data of the UE 100 and provide the subscription data of the UE 100 to the UDM. The UDR may further store the operator policy information and provide the operator policy information to the PCF 140. The NSSF 160 may be an NF that selects a network slice instance to serve the UE 100 or determine network slice selection assistance information (NSSAI). The AUSF 165 may be an NF that has a function of supporting authentication for 3GPP access or non-3GPP access. The AF 170 may be an NF that provides a function for services according to the disclosure. The DN 175 may be an NF that provides an operator service, Internet access, or the 3rd party service, or the like.

Figure 2:
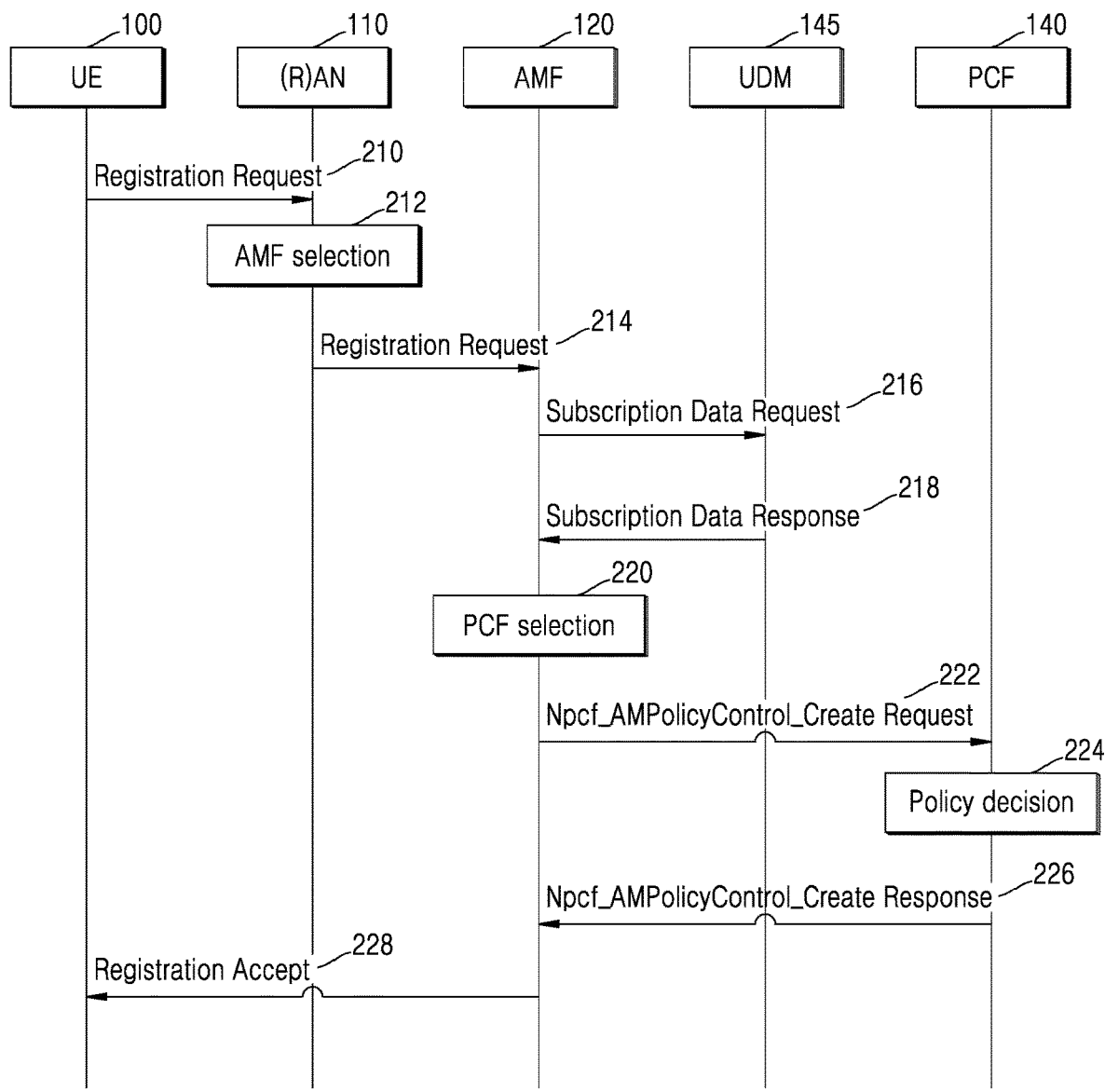
FIG. 2 is a sequence diagram illustrating a user equipment (UE) registration procedure, according to an embodiment of the disclosure.

FIG. 2 is a sequence diagram illustrating a UE registration procedure, according to an embodiment of the disclosure. FIG. 2 shows interactions between the UE 100, the BS 110, the AMF 120, the UDM 145, and the PCF 140.

Referring to FIG. 2, in operation 210, the UE 100 may compose and transmit a registration request message to the BS 110. In an embodiment of the disclosure, the registration message may include a UE identifier (e.g., a subscription permanent identifier (SUPI), a subscription concealed identifier (SUCI), a 5G globally unique temporary identifier (5G-GUTI), or the like), a requested slice (e.g., requested NSSAI, which is slice information that the UE 100 wants to use via network), and/or the like.

In operation 212, the BS 110 may select the AMF 120. For example, upon reception of the registration request message from the UE 100, the BS 110 may select the AMF 120 to forward the message received in operation 210 to, based on the information (e.g., requested NSSAI, UE identifier, etc.) received from the UE 100 in operation 210.

In operation 214, the BS 110 may transmit the registration request message to the AMF 120. For example, the BS 110 may forward the registration request message to the AMF 120 selected in operation 212.

In operation 216, the AMF 120 may request UE subscription data from the UDM 145.

In operation 218, the UDM 145 may transmit to the AMF 120 a response to the request for the UE subscription data. For example, the AMF 120 may obtain information regarding the UE 100 (e.g., access and mobility subscription data, SMF selection subscription data, a UE context, subscribed data network names (DNNs), subscribed S-NSSAI, etc.) from the UDM 145.

In operation 220, the AMF 120 may perform a PCF selection procedure. For example, the AMF 120 may determine to select a PCF that supports a DNN replacement function, based on at least one of information received from the UE 100, information received from the UDM 145 or a local policy of the AMF 120. The AMF may then select the PCF 140 that supports the DNN replacement function.

In operation 222, the AMF 120 may transmit an Npcf_AMPolicyControl_Create request message to the PCF 140. For example, the AMF 120 may perform AM policy association establishment with the PCF 140 selected in operation 220. In an embodiment of the disclosure, the Npcf_AMPolicyControl_Create request message transmitted by the AMF 120 to the PCF 140 may include information about a network slice available for the UE 100 (e.g., Allowed NSSAI, Subscribed S-NSSAI, or the like).

In operation 224, the PCF 140 may determine a policy. For example, the PCF 140 may determine policy information to be provided for the AMF 120 based on the information received from the AMF 120. For example, the PCF 140 may determine information for the AMF 120 to trigger DNN replacement. The DNN replacement trigger information may include DNN replacement of unsupported DNNs, List of S-NSSAIs, Per S-NSSAI: List of DNNs, or the like. In an embodiment of the disclosure, the DNN replacement trigger information may refer to policy information to be provided by the PCF 140 for the AMF 120. Elements to be included in the DNN replacement trigger information may be defined as follows:

N replacement of unsupported DNNs: indicating that the AMF needs to request DNN replacement from the PCF when the AMF is requested by the UE for a DNN that is not supported by the AMF.

List of S-NSSAIs: defined as S-NSSAIs including a DNN replaceable by the PCF.

List of DNNs: indicating that the AMF needs to request DNN replacement from the PCF when the UE requests the DNN.

In operation 226, the PCF 140 may transmit an Npcf_AMPolicyControl_Create response message to the AMF 120. In an embodiment of the disclosure, the Npcf_AMPolicyControl_Create response message transmitted by the PCF 140 to the AMF 120 may include the DNN replacement trigger information determined by the PCF 140. The AMF 120 may store the DNN replacement trigger information received from the PCF 140, and use the DNN replacement trigger information in a later operation or procedure of the AMF 120.

In operation 228, the AMF 120 may transmit a registration accept message to the UE 100. The AMF 120 may add information about a slice available (e.g., Allowed NSSAI) for the UE 100 through a network to the registration accept message.

As described above in FIG. 2, the AMF 120 may receive the registration request message from the BS 110, receive UE subscription data from the UDM 145, select the PCF 140 based on the UE subscription data, and transmit a request message for AM policy association establishment to the selected PCF 140. The PCF 140 may determine policy information to be provided for the AMF 120 based on the information included in the request message for AM policy association establishment. The AMF 120 may receive a response message including the policy information determined by the PCF 140, and transmit a registration accept message to the UE 100.

Figure 3:
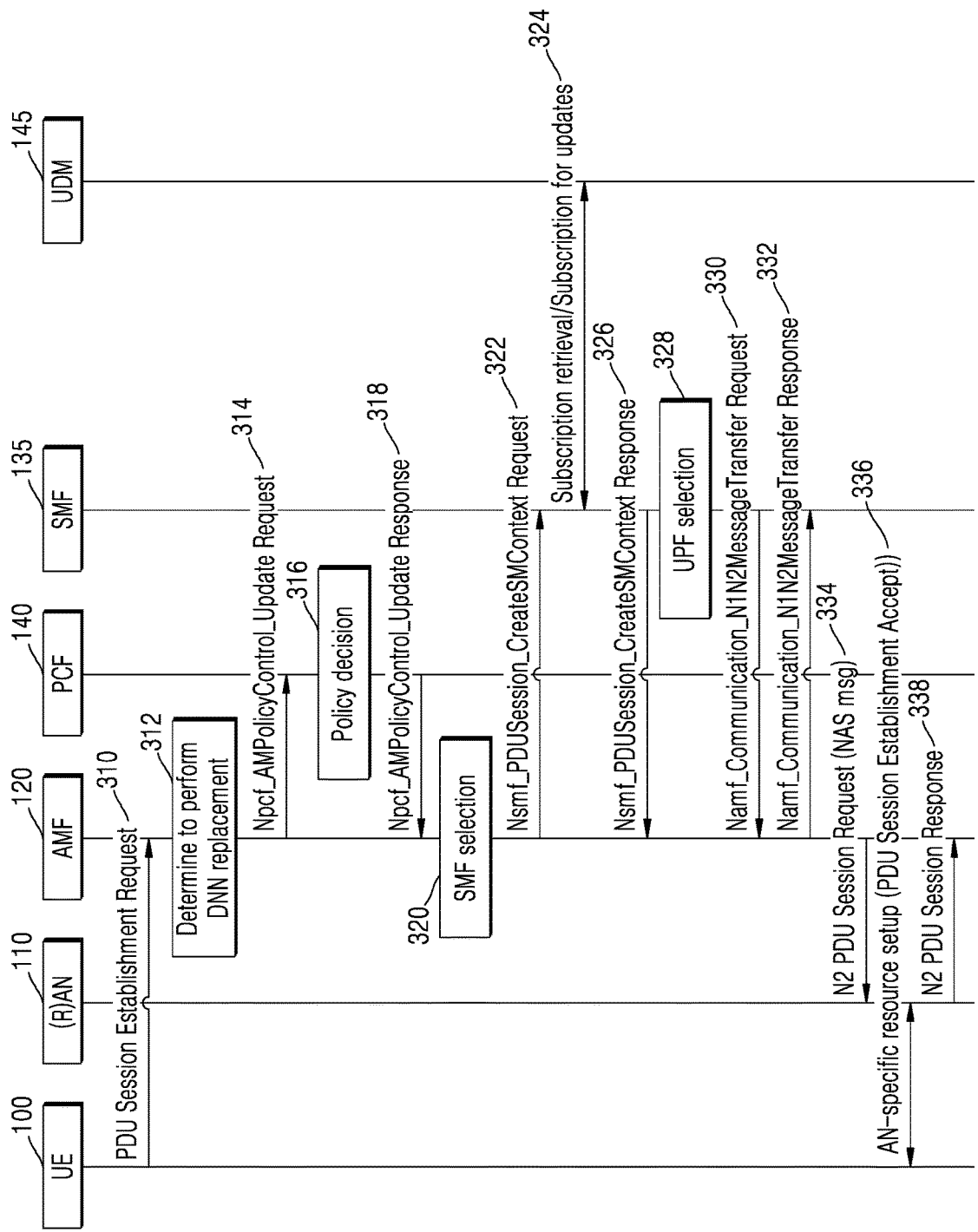
FIG. 3 is a sequence diagram illustrating a protocol data unit (PDU) session establishment procedure, according to an embodiment of the disclosure.

FIG. 3 is a sequence diagram illustrating a PDU session establishment procedure, according to an embodiment of the disclosure. FIG. 3 shows interactions between the UE 100, the BS 110, the AMF 120, the SMF 135, the PCF 140, and the UDM 145.

Referring to FIG. 3, in operation 310, the UE 100 may transmit a PDU session establishment request message to the AMF 120. The PDU session establishment request message may include a DNN and/or S-NSSAI determined by the UE 100 based on a local configuration of the UE 100 or UE route selection policy (URSP) information, a PDU session ID allocated by the UE 100, or the like.

In operation 312, the AMF 120 may determine whether to perform DNN replacement based on at least one of the information received from the UE 100 in operation 310, the information received from the PCF 140 in operation 226 of FIG. 2, the local configuration information of the AMF 120, or mobile communication operator policy information. For example, when the AMF 120 receives DNN replacement of unsupported DNNs from the PCF 140 in operation 226 of FIG. 2, and the DNN received from the UE 100 in operation 310 is not supported by the AMF 120, the AMF 120 may determine to perform DNN replacement.

Or, for example, when the AMF 120 receives List of S-NSSAIs from the PCF 140 in operation 226 of FIG. 2, and the List of S-NSSAIs includes the S-NSSAI received from the UE 100 in operation 310, the AMF 120 may determine to perform DNN replacement.

Or, for example, when the AMF 120 receives List of DNNs from the PCF 140 in operation 226 of FIG. 2, and the List of DNNs includes the DNN received from the UE 100 in operation 310, the AMF 120 may determine to perform DNN replacement.

In an embodiment of the disclosure, the AMF 120 that has determined to perform DNN replacement may perform the following operation 314 to request DNN replacement from the PCF 140 that makes AM policy association with the AMF 120, based on the policy information received from the PCF 140 in operation 226 of FIG. 2.

In operation 314, the AMF 120 may transmit an Npcf_AMPolicyControl_Update request message to the PCF 140. The Npcf_AMPolicyControl_Update request message may include at least one of requested DNN, requested S-NSSAI, or an identifier of the UE 100 (e.g., SUPI, 5G-GUTI, or the like) received from the UE 100 in operation 310.

In operation 316, the PCF 140 may determine a policy. For example, the PCF 140 may make a decision of a DNN replacement policy based on the information received from the AMF 120, local configuration information of the PCF 140, and/or operator policy information. For example, the PCF 140 may determine a selected DNN to replace the requested DNN. In this case, the PCF 140 may determine the selected DNN by taking into account the requested S-NSSAI. For example, the PCF 140 may determine the selected DNN to be one of DNNs that may be supported by the requested S-NSSAI.

In operation 318, the PCF 140 may transmit an Npcf_AMPolicyControl_Update response message to the AMF 120. The Npcf_AMPolicyControl_Update response message may include the selected DNN determined by the PCF 140. Upon reception of the Npcf_AMPolicyControl_Update response message, the AMF 120 may store the selected DNN and the requested DNN associated with a PDU session (e.g., indicated by a PDU session ID).

In operation 320, the AMF 120 may select the SMF 135. For example, the AMF 120 may handle PDU session establishment using the selected DNN received from the PCF 140 instead of the requested DNN received from the UE 100. For example, the AMF 120 may select the SMF 135 that supports the selected DNN.

In operation 322, the AMF 120 may transmit an Nsmf_PDUSession_CreateSMContext request message to the SMF 135. The Nsmf_PDUSession_CreateSMContext request message may include the requested DNN requested by the UE 100 and the selected DNN determined by the PCF 140. The Nsmf_PDUSession_CreateSMContext request message may also include an SM context ID. The SMF 135 may perform a PDU session establishment procedure using the selected DNN as will be described below.

In operation 324, the SMF 135 may obtain session management subscription data from the UDM 145. The SMF 135 may authenticate a PDU session establishment request based on the subscription data obtained from the UDM 145.

In operation 326, the SMF 135 may transmit an Nsmf_PDUSession_CreateSMContext response message to the AMF 120. The Nsmf_PDUSession_CreateSMContext response message may include an SM context ID.

In operation 328, the SMF 135 may select the UPF 130. For example, the SMF 135 may select the UPF 130 that supports the selected DNN. The SMF 135 may establish an N4 session with the UPF 130.

In operation 330, the SMF 135 may transmit a Namf_Communication_N1N2MessageTransfer request message to the AMF 120. The Namf_Communication_N1N2MessageTransfer request message may include a PDU session establishment accept message. The PDU session establishment accept message may include the requested DNN requested by the UE 100.

In operation 332, the AMF 120 may transmit a Namf_Communication_N1N2MessageTransfer response message to the SMF 135.

In operation 334, the AMF 120 may transmit a N2 PDU session request message to the BS 110. The N2 PDU session request message may include the PDU session establishment accept message received by the AMF 120 from the SMF 135.

In operation 336, the BS 110 may perform AN-specific resource setup with the UE 100. The BS 110 may transmit a radio resource control (RRC) message to the UE 100 for the AN-specific resource setup. The RRC message transmitted by the BS 110 to the UE 100 for the AN-specific resource setup may include a PDU session establishment accept message received by the BS 110 from the AMF 120.

In an embodiment of the disclosure, when receiving the PDU session establishment accept message from the BS 110, the UE 100 may determine that PDU session establishment has been successful. Through the procedure as shown in FIG. 3, the UE 100 may determine that a PDU session has been established with the requested DNN, and transmit or receive data using the PDU session. In the meantime, a DNN actually used by the 5G core network for the PDU session establishment may be the selected DNN.

In operation 338, the BS 110 may transmit an N2 PDU session response message to the AMF 120.

Embodiment 1 for providing a policy update method, embodiment 2 for providing a PDU session handling method based on policy updating, and embodiment 3 for providing a method of obtaining and using DNN replacement trigger information at an AMF obtaining and using DNN replacement trigger will now be described.

Embodiment 1

The embodiment 1 provides a policy update method according to an embodiment of the disclosure. The embodiment 1 is illustrated in FIGS. 4 and 5.

Figure 4:
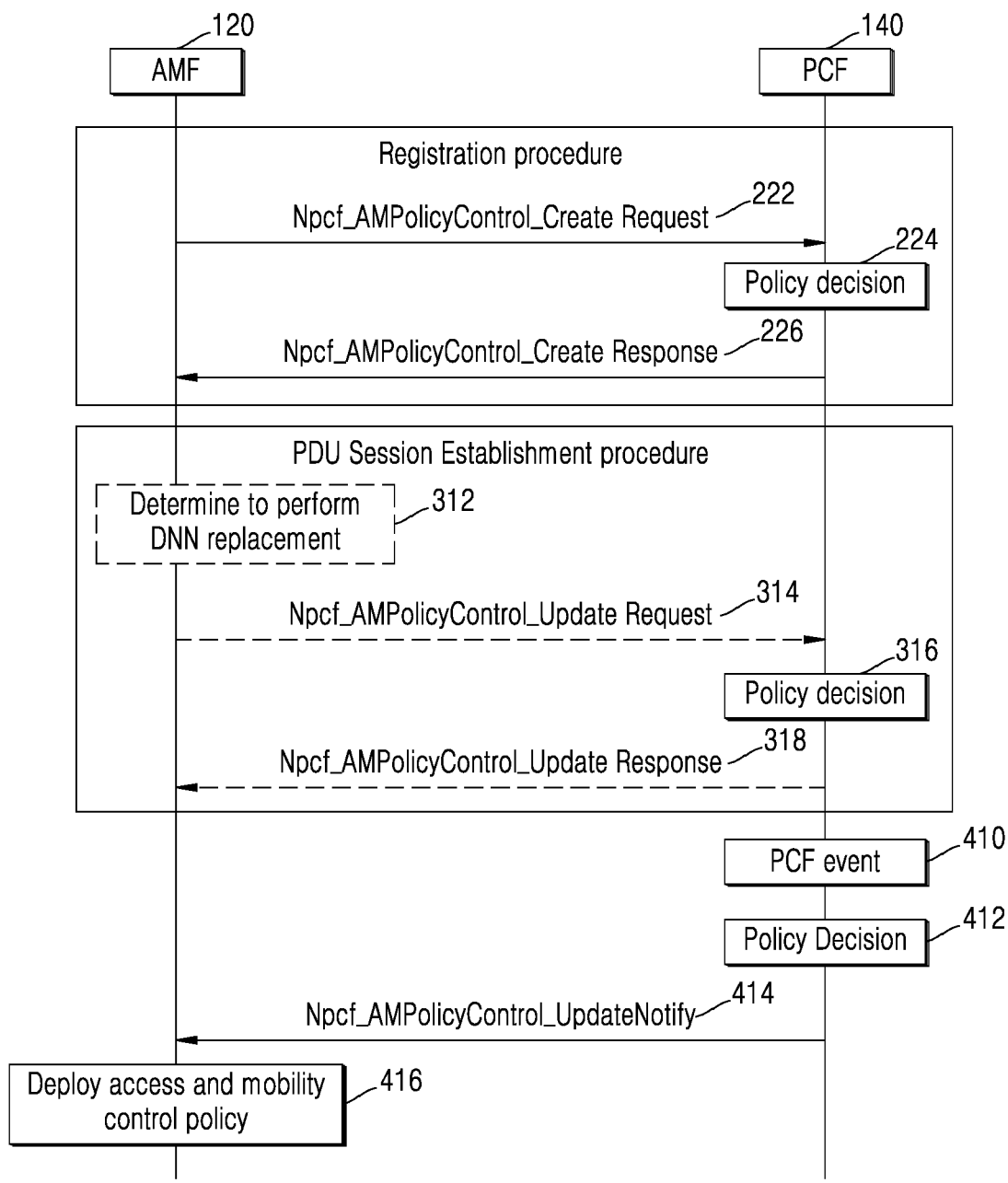
FIG. 4 is a sequence diagram illustrating a policy association modification procedure initiated by a policy control function (PCF), according to an embodiment of the disclosure.
Figure 5:
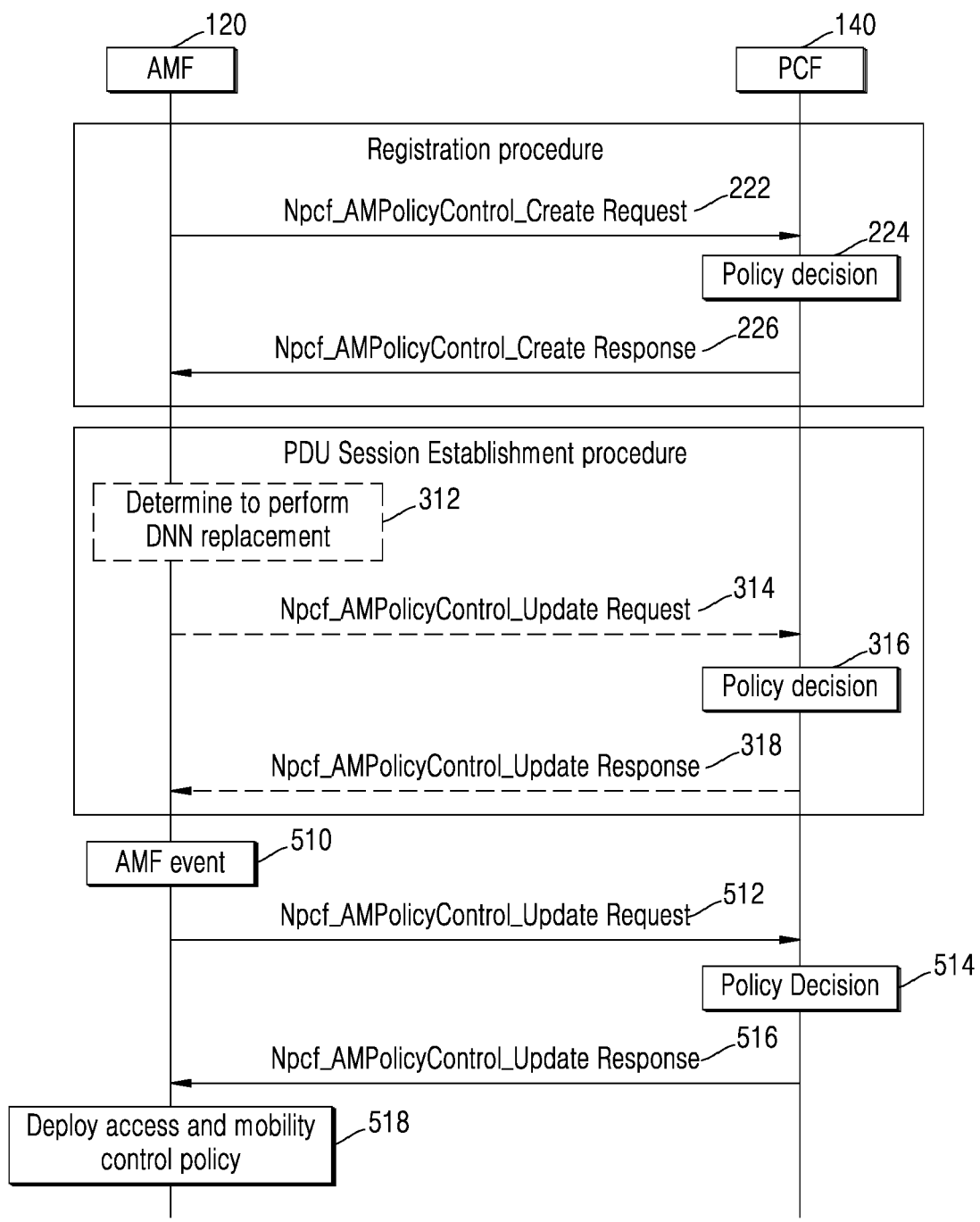
FIG. 5 is a sequence diagram illustrating a policy association modification procedure initiated by an access and mobility management function (AMF), according to an embodiment of the disclosure.

FIG. 4 is a sequence diagram illustrating a policy association modification procedure initiated by a PCF, according to an embodiment of the disclosure.

In an embodiment of the disclosure, the AMF 120 and the PCF 140 may perform the registration procedure as shown in FIG. 2, and establish AM policy association setup. For example, in operation 222, the AMF 120 may transmit an Npcf_AMPolicyControl_Create request message to the PCF 140. In operation 224, the PCF 140 may determine policy information to be provided for the AMF 120 based on the information received from the AMF 120. For example, the PCF 140 may determine DNN replacement trigger information. In operation 226, the PCF 140 may transmit an Npcf_AMPolicyControl_Create response message to the AMF 120. Specifically, in operation 226, the PCF 140 may transmit DNN replacement trigger information to the AMF 120. The AMF 120 may store the DNN replacement trigger information received from the PCF 140 to be used in a later procedure. In an embodiment of the disclosure, the DNN replacement trigger information may be included in the Npcf_AMPolicyControl_Create response message.

Furthermore, in an embodiment of the disclosure, the AMF 120 may establish a PDU session using a selected DNN received from the PCF 140 instead of the requested DNN requested by the UE 100 through the procedure as shown in FIG. 3. Specifically, in operation 312, the AMF 120 may determine that DNN replacement is required. When the AMF 120 determines that DNN replacement is required, the AMF 120 may request DNN replacement information from the PCF 140 in operation 314. For example, in operation 314, the Npcf_AMPolicyControl_Update request message transmitted by the AMF 120 to the PCF 140 may include DNN replacement information. In operation 316, the PCF 140 may determine a policy for DNN replacement using the DNN replacement information included in the Npcf_AMPolicyControl_Update request message received from the AMF 120. For example, the PCF 140 may determine the selected DNN. In operation 318, the PCF 140 may transmit an Npcf_AMPolicyControl_Update response message to the AMF 120. The Npcf_AMPolicyControl_Update response message may include the selected DNN determined by the PCF 140. The AMF 120 may establish a PDU session using the selected DNN received from the PCF 140.

The AMF 120 and the PCF 140 may perform a registration procedure in the aforementioned operations 222 to 226, and perform a PDU session establishment procedure in operations 312 to 318. The AMF 120 and the PCF 140 may perform the following operations 410 to 416.

Referring to FIG. 4, in operation 410, the PCF 140 that has established the AM policy association setup with the AMF 120 may determine that a new policy is required. For example, the PCF 140 may determine to change the DNN replacement trigger information transmitted in operation 226 of FIG. 2 or the DNN replacement information (e.g., the selected DNN) transmitted in operation 318 of FIG. 3, based on an operator policy, a roaming agreement with another public land mobile network (PLMN), a network deployment change, etc.

In operation 412, the PCF 140 may determine a new policy to be changed to due to the event in operation 410.

In an embodiment of the disclosure, in operation 412, the PCF 140 may change the DNN replacement trigger information determined in operation 224 of FIG. 2.

For example, the PCF 140 indicates DNN replacement of unsupported DNNs in operation 224 of FIG. 2, but in operation 412, may determine not to indicate the DNN replacement of unsupported DNN. Alternatively, the PCF 140 does not indicate DNN replacement of unsupported DNNs in operation 224 of FIG. 2, but in operation 412, may determine to indicate the DNN replacement of unsupported DNN.

Or, for example, in operation 412, the PCF 140 may change the List of S-NSSAIs determined in operation 224 of FIG. 2. For example, in operation 412, the PCF 140 may delete (or discard, ignore, release, or suspend) one or more S-NSSAIs included in the List of S-NSSAIs determined in operation 224 of FIG. 2. Alternatively, in operation 412, the PCF 140 may add one or more S-NSSAIs that have not been included in the List of S-NSSAIs determined in operation 224 of FIG. 2.

Alternatively, for example, in operation 412, the PCF 140 may change the List of DNNs determined in operation 224 of FIG. 2. For example, in operation 412, the PCF 140 may delete one or more DNNs included in the List of DNNs determined in operation 224 of FIG. 2. Alternatively, in operation 412, the PCF 140 may add one or more DNNs that have not been included in the List of DNNs determined in operation 224 of FIG. 2.

In an embodiment of the disclosure, in operation 412, the PCF 140 may change the DNN replacement information (e.g., the selected DNN) determined in operation 316 of FIG. 3.

For example, the PCF 140 may change the selected DNN (e.g., DNN B) corresponding to the requested DNN (e.g., DNN A) determined in operation 316 of FIG. 3 to another selected DNN (e.g., DNN C), in operation 412.

In operation 414, the PCF 140 may transmit an Npcf_AMPolicyControl_UpdateNotify message to the AMF 120. The Npcf_AMPolicyControl_UpdateNotify message may include new policy information (e.g., DNN replacement trigger information or selected DNN information) changed in operation 412.

In operation 416, the AMF 120 may compare the policy information received and stored in operation 226 of FIG. 2 or in operation 318 of FIG. 3 with the new policy information received in operation 414. When PDU session modification is required due to the received new policy information, the AMF 120 may perform operations of the following embodiment 2.

FIG. 5 is a sequence diagram illustrating a policy association modification procedure initiated by an AMF, according to an embodiment of the disclosure.

In an embodiment of the disclosure, the AMF 120 and the PCF 140 may perform the registration procedure as shown in FIG. 2, and establish an AM policy association setup. For example, in operation 222, the AMF 120 may transmit an Npcf_AMPolicyControl_Create request message to the PCF 140. In operation 224, the PCF 140 may determine policy information to be provided for the AMF 120 based on the information received from the AMF 120. For example, the PCF 140 may determine DNN replacement trigger information. In operation 226, the PCF 140 may transmit an Npcf_AMPolicyControl_Create response message to the AMF 120. Specifically, in operation 226, the PCF 140 may transmit DNN replacement trigger information to the AMF 120. The AMF 120 may store the DNN replacement trigger information received from the PCF 140 to be used in a later procedure. In an embodiment of the disclosure, the DNN replacement trigger information may be included in the Npcf_AMPolicyControl_Create response message.

Furthermore, in an embodiment of the disclosure, the AMF 120 may establish a PDU session using a selected DNN received from the PCF 140 instead of the requested DNN requested by the UE 100 through the procedure as shown in FIG. 3. Specifically, in operation 312, the AMF 120 may determine that DNN replacement is required. When the AMF 120 determines that DNN replacement is required, the AMF 120 may request DNN replacement information from the PCF 140 in operation 314. For example, in operation 314, the Npcf_AMPolicyControl_Update request message transmitted by the AMF 120 to the PCF 140 may include DNN replacement information. In operation 316, the PCF 140 may determine a policy for DNN replacement using the DNN replacement information included in the Npcf_AMPolicyControl_Update request message received from the AMF 120. For example, the PCF 140 may determine the selected DNN. In operation 318, the PCF 140 may transmit an Npcf_AMPolicyControl_Update response message to the AMF 120. The Npcf_AMPolicyControl_Update response message may include the selected DNN determined by the PCF 140. The AMF 120 may establish a PDU session using the selected DNN received from the PCF 140.

The AMF 120 and the PCF 140 may perform a registration procedure in the aforementioned operations 222 to 226, and perform a PDU session establishment procedure in operations 312 to 318. The AMF 120 and the PCF 140 may perform the following operations 510 to 518.

Referring to FIG. 5, in operation 510, the PCF 140 that has established AM policy association setup with the AMF 120 may determine that a new policy is required. For example, the AMF 120 may allocate a new allowed slice (e.g., Allowed NSSAI) to the UE 100, and accordingly, determine that a change of some of the DNN replacement trigger information (e.g., List of S-NSSAIs) received in operation 226 of FIG. 2 is required.

In operation 512, the AMF 120 may transmit an Npcf_AMPolicyControl_Update request message to the PCF 140. The Npcf_AMPolicyControl_Update request message may include the new allowed slice (Allowed NSSAI) allocated to the UE 100.

In operation 514, the PCF 140 may determine a policy. For example, the PCF 140 may determine a new policy to be changed to, based on the information received from the AMF 120.

In an embodiment of the disclosure, in operation 514, the PCF 140 may change the DNN replacement trigger information determined in operation 224 of FIG. 2.

For example, the PCF 140 indicates DNN replacement of unsupported DNNs in operation 224 of FIG. 2, but in operation 514, may determine not to indicate the DNN replacement of unsupported DNN. Alternatively, the PCF 140 does not indicate DNN replacement of unsupported DNNs in operation 224 of FIG. 2, but in operation 514, may determine to indicate the DNN replacement of unsupported DNN.

Or, for example, in operation 514, the PCF 140 may change the List of S-NSSAIs determined in operation 224 of FIG. 2 to fit to the Allowed NSSAI received in operation 512. For example, in operation 514, the PCF 140 may delete one or more S-NSSAIs included in the List of S-NSSAIs determined in operation 224 of FIG. 2, when the one or more S-NSSAIs are not included in the Allowed NSSAI received in operation 512. Furthermore, in operation 514, the PCF 140 may add one or more S-NSSAIs that are not included in the List of S-NSSAIs determined in operation 224 of FIG. 2, when the one or more S-NSSAIs are included in the Allowed NSSAI received in operation 512.

Or, for example, in operation 514, the PCF 140 may change the List of DNNs determined in operation 224 of FIG. 2. For example, in operation 514, the PCF 140 may delete one or more DNNs included in the List of DNNs determined in operation 224 of FIG. 2. Or, in operation 514, the PCF 140 may add one or more DNNs that are not included in the List of DNNs determined in operation 224 of FIG. 2. Or, the PCF 140 may delete the List of DNNs determined in operation 224 of FIG. 2, when associated S-NSSAI among the List of DNNs is not included in the Allowed NSSAI received in operation 512. The PCF 140 may determine a List of DNNs for an S-NSSAI newly added to the Allowed NSSAI received in operation 512.

In an embodiment of the disclosure, in operation 514, the PCF 140 may change the DNN replacement information (e.g., the selected DNN) determined in operation 316 of FIG. 3.

For example, the PCF 140 may change the selected DNN (e.g., DNN B) corresponding to the requested DNN (e.g., DNN A) determined in operation 316 of FIG. 3 to another selected DNN (e.g., DNN C), in operation 514.

In operation 516, the PCF 140 may transmit an Npcf_AMPolicyControl_Update response message to the AMF 120. The Npcf_AMPolicyControl_Update response message may include new policy information (e.g., DNN replacement trigger information or selected DNN information) changed in operation 514.

In operation 518, the AMF 120 may compare the policy information received and stored in operation 226 of FIG. 2 or in operation 318 of FIG. 3 with the new policy information received in operation 516. When PDU session modification is required due to the received new policy information, the AMF 120 may perform operations of the following embodiment 2.

Embodiment 2

The embodiment 2 provides a PDU session handling method based on policy update.

The AMF 120 may perform the procedure as shown in FIGS. 2 and 3 to receive policy information (hereinafter, first policy information) from the PCF 140 and establish a PDU session. After the PDU session is established, the AMF 120 may perform the procedure as shown in FIGS. 4 and 5 to receive new policy information (hereinafter, second policy information) from the PCF 140. In this case, there may be a mismatch between a PDU session context/status set up based on the first policy information and the second policy information.

For example, the AMF 120 may establish a PDU session by changing the requested DNN (e.g., DNN A) requested by the UE 100 to the selected DNN (e.g., DNN B) based on the first policy information. On the contrary, the second policy information may indicate that the requested DNN (e.g., DNN A) is changed to the selected DNN (e.g., DNN C). That is, the current DNN (e.g., DNN B) of the established PDU session needs to be changed to the new DNN (e.g., DNN C).

Or, for example, the AMF 120 may establish a PDU session by changing the requested DNN (e.g., DNN A) requested by the UE 100 to the selected DNN (e.g., DNN B) based on the first policy information. On the contrary, the second policy information may not include DNN replacement information for the requested DNN (e.g., DNN A). For example, when the current DNN (e.g., DNN B) of the established PDU session is changed to the DNN (e.g., DNN A) requested by the UE 100 or when the AMF 120 may not support the DNN (e.g., DNN A) requested by the UE 100, the established PDU session may need to be released.

Or, for example, the AMF 120 may establish a PDU session using the requested DNN (e.g., DNN A) requested by the UE 100 (i.e., without changing the requested DNN requested by the UE 100) based on the first policy information. On the contrary, the second policy information may indicate that the requested DNN (e.g., DNN A) is changed to the selected DNN (e.g., DNN C). That is, the current DNN (e.g., DNN A) of the established PDU session needs to be changed to a new DNN (e.g., DNN C).

Figure 6:
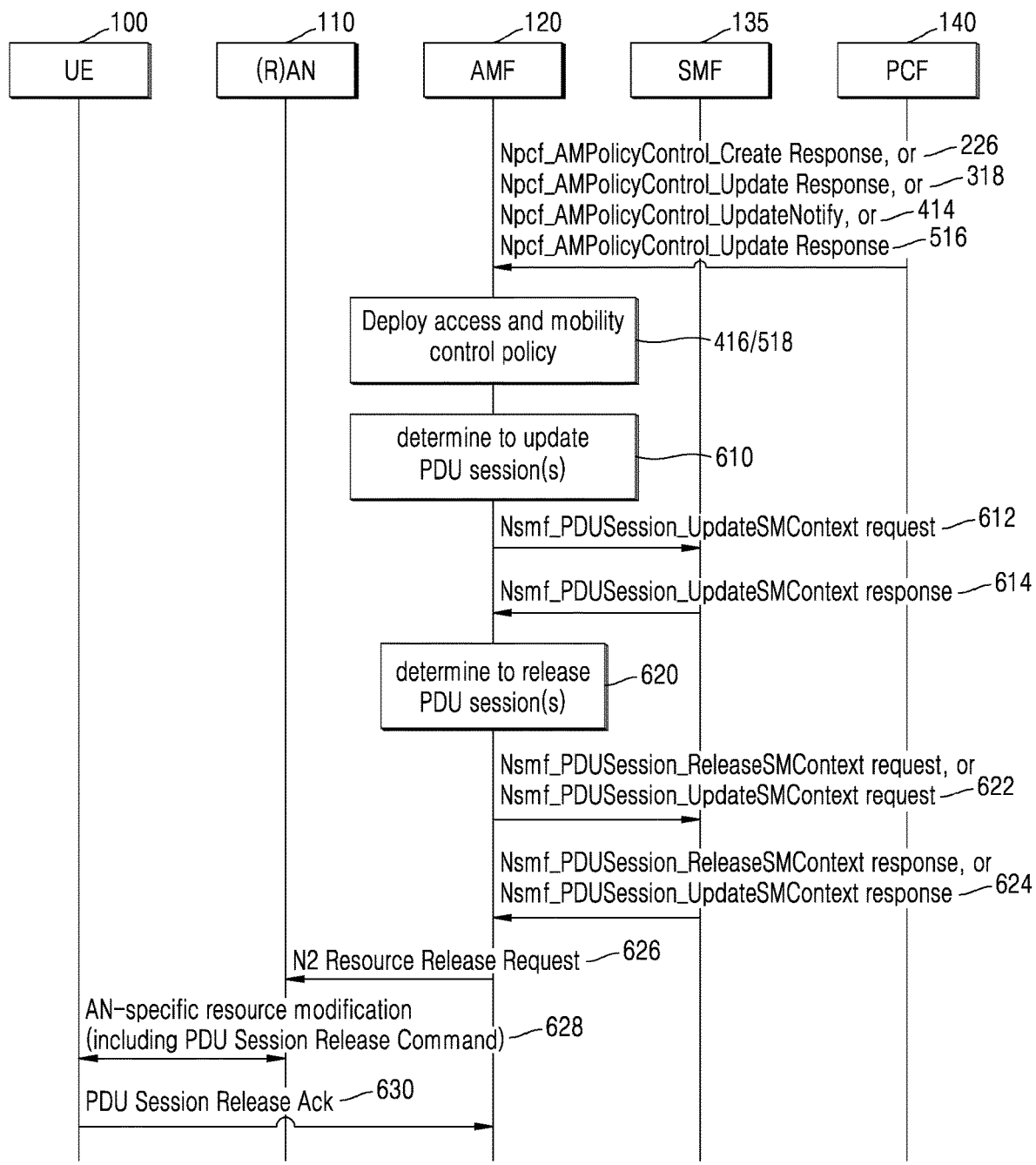
FIG. 6 is a sequence diagram illustrating a PDU session modification procedure, according to an embodiment of the disclosure.

FIG. 6 is a sequence diagram illustrating a PDU session modification procedure, according to an embodiment of the disclosure. In the disclosure, an NF (e.g., the AMF 120, the SMF 135, the PCF 140, or the like) may use the procedure of FIG. 6 to change a DNN of the established PDU session or release the established PDU session.

Referring to FIG. 6, the AMF 120 may receive (new or latest) AM policy information from the PCF 140 in operation 226, 318, 414, or 516. The AMF 120 may apply the received (new or latest) AM policy information to perform access and mobility control, in operation 416 or 518.

In an embodiment of the disclosure, the AM policy information may include information about how the AMF 120 handles a PDU session when there is a mismatch between a PDU session context/status managed by the AMF 120 and the policy information transmitted by the PCF 140. Such a PDU session handling method may be determined by an operator policy.

For example, when there is a mismatch between the PDU session context/status managed by the AMF 120 and the policy information transmitted by the PCF 140, the PDU session handling method may include maintaining the existing PDU session (e.g., the PDU session managed by the AMF 120) and applying new or latest policy information (e.g., the policy information transmitted by the PCF 140) only to a new PDU session request.

Or, for example, when there is a mismatch between the PDU session context/status managed by the AMF 120 and the policy information transmitted by the PCF 140, the PDU session handling method may include maintaining the existing PDU session (e.g., the PDU session managed by the AMF 120) but releasing the existing PDU session when the PDU session is UP deactivated.

Or, for example, when there is a mismatch between the PDU session context/status managed by the AMF 120 and the policy information transmitted by the PCF 140, the PDU session handling method may include releasing the existing PDU session (e.g., releasing the existing PDU session managed by the AMF 120).

Or, for example, when there is a mismatch between the PDU session context/status managed by the AMF 120 and the policy information transmitted by the PCF 140, the PDU session handling method may include performing a PDU session modification procedure.

When there is a mismatch between the PDU session context/status managed by the AMF 120 and the policy information received from the PCF 140, the PDU session handling method performed by the AMF 120 may be set up in the AMF 120 in advance in a local policy of the AMF 120. For example, the PCF 140 may inform the AMF 120 of a method of handling a PDU session at the AMF 120 in a policy rule, and the AMF 120 may determine the policy rule as a local policy of the AMF 120. Or, as described above, it may be set up in advance in the AMF 120 as the local policy of the AMF 120.

In operation 610, the AMF 120 may use the procedure as shown in FIG. 3 to determine whether there is a mismatch between the PDU session context/status set up based on the first policy information received from the PCF 140 and the second policy information received in operation 414 or 516. When it is determined that there is the mismatch, the AMF 120 may handle the PDU session in which the mismatch occurs, according to the PDU session handling method set up in advance in the AMF 120 as described below.

For example, in a case that when there is the mismatch, it is indicated in the PDU session handling method that the existing PDU session is to be maintained and the new/latest policy information is to be applied to a new PDU session request only, AMF 120 may not perform operations 612 to 630 of FIG. 6.

In another example, in a case that when there is the mismatch, it is indicated in the PDU session handling method that the existing PDU session is to be maintained but released when the PDU session is UP deactivated, AMF 120 may not perform operations 612 to 614 of FIG. 6. Furthermore, the AMF 120 may perform operation 620 and a procedure after operation 620.

In another example, in a case that when there is the mismatch, it is indicated in the PDU session handling method that the existing PDU session is to be released, AMF 120 may not perform operations 612 to 614 of FIG. 6. Furthermore, the AMF 120 may perform operation 620 and a procedure after operation 620.

In another example, in a case that when there is the mismatch, it is indicated in the PDU session handling method that a PDU session modification procedure is to be performed, AMF 120 may perform operation 612 and a procedure after operation 612.

In operation 612, the AMF 120 may establish a PDU session by changing the requested DNN (e.g., DNN A) requested by the UE to the selected DNN (e.g., DNN B) based on the first policy information. On the contrary, the second policy information may indicate that the requested DNN (e.g., DNN A) is changed to the selected DNN (e.g., DNN C). That is, the current DNN (e.g., DNN B) of the established PDU session needs to be changed to the new DNN (e.g., DNN C).

To change the current DNN (e.g., DNN B) of the established PDU session to the new DNN (e.g., DNN C), the AMF 120 may transmit an Nsmf_PDUSession_UpdateSMContext request message to the SMF 135, in operation 612. The Nsmf_PDUSession_UpdateSMContext request message may include at least one of the requested DNN (e.g., DNN A) requested by the UE 100, the current DNN (e.g., DNN B) of the PDU session or the DNN to be newly changed to (e.g., DNN C). Furthermore, the Nsmf_PDUSession_UpdateSMContext request message may include an SM context ID.

In operation 614, upon reception of the Nsmf_PDUSession_UpdateSMContext request message, the SMF 135 may check a context of a PDU session indicated by the SM context ID included in the Nsmf_PDUSession_UpdateSMContext request message. The SMF 135 may also determine whether the SMF 135 is able to support the DNN (e.g., DNN C) to be newly changed to, which is requested from the AMF 120. For example, the SMF 135 may check whether the SMF 135 is able to support the DNN (e.g., DNN C) to be newly changed to. Furthermore, the SMF 135 may check whether a change of the SMF 135 or a change of the UPF that supports the PDU session is required. When the SMF 135 is not able to support the DNN (e.g., DNN C) to be newly changed to or a change of the SMF 135 or a change of the UPF is required, the SMF 135 may determine that it may not be able to support the DNN (e.g., DNN C) to be newly changed to.

In an embodiment of the disclosure, when determining that it may not support the DNN (e.g., DNN C) to be newly changed to, the SMF 135 may respond to the AMF 120 with an Nsmf_PDUSession_UpdateSMContext response message. The Nsmf_PDUSession_UpdateSMContext response message may include information indicating that a change of DNN is not possible.

In an embodiment of the disclosure, when determining that it is able to support the DNN (e.g. DNN C) to be newly changed to, the SMF 135 may change the DNN of the PDU session indicated by the SM context ID from the current DNN (e.g., DNN B) to the DNN (e.g., DNN C) to be newly changed to. Although not shown in FIG. 6, the SMF 135 may transmit an N4 session modification request message to a UPF that supports the PDU session. The N4 session modification request message may include the new DNN information (e.g., DNN C). The SMF 135 may respond to the AMF 120 with an Nsmf_PDUSession_UpdateSMContext response message. The Nsmf_PDUSession_UpdateSMContext response message may include information indicating that a change of DNN is possible or that the change of DNN has been completed.

In an embodiment of the disclosure, upon reception of the Nsmf_PDUSession_UpdateSMContext response message, the AMF 120 may not perform operations 620 to 630 when the change of DNN is possible or the change of DNN has been completed.

In an embodiment of the disclosure, upon reception of the Nsmf_PDUSession_UpdateSMContext response message, the AMF 120 may not perform operation 620 and a procedure after operation 620 when the change of DNN is not possible.

In operation 620, the AMF 120 may determine to release the PDU session established based on the first policy information.

For example, when the PDU session handling method received by the AMF 120 from the PCF 140 or set up in advance in the AMF 120 indicates release of the PDU session in which the mismatch has occurred, the AMF 120 may determine to release the PDU session.

Or, for example, when the AMF 120 receives, from the SMF 135, a message indicating that the change of DNN is not possible in operation 614, the AMF 120 may determine to release the PDU session.

In operation 622, the AMF 120 may transmit an Nsmf_PDUSession_ReleaseSMContext request message or an Nsmf_PDUSession_UpdateSMContext request message to the SMF 135 to release the PDU session. The Nsmf_PDUSession_ReleaseSMContext request message or the Nsmf_PDUSession_UpdateSMContext request message may include at least one of SM context ID indicating the PDU session to be released, a release indication, a release cause, or an operation type (e.g., UP deactivate).

In operation 624, upon reception of the Nsmf_PDUSession_ReleaseSMContext request message or the Nsmf_PDUSession_UpdateSMContext request message, the SMF 135 may release the PDU session indicated by the SM context ID. When the Nsmf_PDUSession_ReleaseSMContext request message or the Nsmf_PDUSession_UpdateSMContext request message includes UP deactivate for operation Type, the SMF 135 may wait until the user plane of the PDU session indicated by the SM context ID is deactivated and release the PDU session when the user plane is deactivated. After releasing the PDU session, the SMF 135 may delete an associated SM context.

The SMF 135 may respond to the AMF 120 with an Nsmf_PDUSession_ReleaseSMContext response message or an Nsmf_PDUSession_UpdateSMContext response message. The Nsmf_PDUSession_ReleaseSMContext response message or the Nsmf_PDUSession_UpdateSMContext response message may include at least one of a result indication, a cause, a cause value, or an N1N2 SM container. The N1N2 SM container may include a PDU session release command. The PDU session release command may include an indication to re-establish a PDU session.

In operation 626, upon reception of the Nsmf_PDUSession_ReleaseSMContext response message or the Nsmf_PDUSession_UpdateSMContext response message, the AMF 120 may know that the PDU session release has been performed. The AMF 120 may transmit an N2 resource release request message to the BS 110. The N2 resource release request may include a PDU session release command received from the SMF 135 in operation 624 or created by the AMF 120.

In operation 628, the BS 110 may perform AN-specific resource modification with the UE 100. An RRC message transmitted by the BS 110 to the UE 100 for AN-specific resource modification may include a PDU session release command message received by the BS 110 from the AMF 120.

In operation 630, upon reception of the PDU session release command message, the UE 100 may release the PDU session indicated by a PDU session ID. The UE 100 may transmit a PDU session release ACK message to the AMF 120.

When the PDU session release command message includes an indication to re-establish a PDU session, or according to a local policy of the UE 100, the UE 100 may perform the PDU session establishment procedure as shown in FIG. 3 again after operation 630.

Upon reception of the PDU session establishment request message from the UE 100 in operation 310 of FIG. 3, the AMF 120 may apply the second policy information to perform a PDU session establishment procedure.

Embodiment 3

The embodiment 3 provides a method of obtaining and using DNN replacement trigger information at an AMF.

In operation 224 of FIG. 2, the DNN replacement trigger information determined by the PCF 140 in operation 224 of FIG. 2 may be configured as follows:

DNN replacement of unsupported DNNs: including selected DNN(s) available for the AMF instead of the unsupported DNN when the AMF is requested from the UE for the unsupported DNN.

List of S-NSSAIs: defined as S-NSSAIs including a DNN replaceable by the PCF. Furthermore, List of S-NSSAIs may include selected DNN(s) available for the AMF along with each S-NSSAI.

List of DNNs: including selected DNN(s) available for the AMF instead of the requested DNN requested by the UE when the UE requests the DNN.

In an embodiment of the disclosure, the PCF 140 may transmit the DNN replacement trigger information to the AMF 120 in operation 226 of FIG. 2. The AMF 120 may store the received DNN replacement trigger information.

In an embodiment of the disclosure, the AMF 120 may determine whether to perform DNN replacement based on at least one of information received from the UE 100 in operation 310 of FIG. 3, information received from the PCF 140 in operation 226 of FIG. 2, local configuration information of the AMF 120, or mobile communication operator policy information.

When determining to perform the DNN replacement, the AMF 120 may select a selected DNN to replace the requested DNN requested from the UE 100 based on the policy information received from the PCF 140 in operation 226 of FIG. 2. For example, the AMF 120 may not perform operations 314, 316, and 318 of FIG. 3 but select a selected DNN using the DNN replacement trigger information stored in the AMF 120. The AMF 120 may select the SMF 135 that supports the selected DNN in operation 320 of FIG. 3. Later operations for PDU session establishment may be the same as the remaining operations of FIG. 3.

Embodiment 4

The embodiment 4 provides a method of updating DNN replacement (or referred to as SMF selection management) information.

In an embodiment of the disclosure, the Npcf_AMPolicyControl_Create request message transmitted by the AMF 120 to the PCF 140 in operation 222 during the registration procedure performed as shown in FIG. 2 may include network slice information available for the UE 100 (e.g., Allowed NSSAI).

In an embodiment of the disclosure, the policy (e.g., DNN replacement or SMF selection management) determined by the PCF 140 in operation 224 during the registration procedure performed as shown in FIG. 2 may include List of S-NSSAIs (e.g., S-NSSAIs including a DNN replaceable by the PCF 140) and List of DNNs per S-NSSAI (Per S-NSSAI: List of DNNs), and the List of S-NSSAIs and the Per S-NSSAI may be S-NSSAIs included in the slice information (e.g., Allowed NSSAI) received from the AMF 120 in operation 222. The PCF 140 may determine to include or configure "change of the allowed slice (change of the Allowed NSSAI)" for the policy control request trigger. This may be configured for the PCF 140 to update SMF selection management (or DNN replacement) related policy information (e.g., List of S-NSSAIs, or Per S-NSSAI: List of DNNs) when the AMF 120 or the NSSF changes the allowed slice (Allowed NSSAI).

In the embodiment of the disclosure, the Npcf_AMPolicyControl_Create response message transmitted by the PCF 140 to the AMF 120 in operation 226 during the registration procedure performed as shown in FIG. 2 may include List of S-NSSAIs including slice information of an allowed slice (e.g., S-NSSAIs of the Allowed NSSAI), Per S-NSSAI: List of DNNs or policy control request trigger including or configured with "change of the allowed slice (change of the Allowed NSSAI)". The AMF 120 may store the received information, and apply the policy.

In an embodiment of the disclosure, during the procedure performed as shown in FIG. 5, in operation 510, the AMF 120 or the NSSF may change the allowed slice (Allowed NSSAI) for the UE 100. When the allowed slice (Allowed NSSAI) has been changed and the AMF 120 receives from the PCF 140 "change of the allowed slice" policy control request trigger in operation 226 of FIG. 2, the AMF 120 may determine that a policy control request trigger condition is met, i.e., that the allowed slice has been changed.

In an embodiment of the disclosure, the Npcf_AMPolicyControl_Update request message transmitted by the AMF 120 to the PCF 140 in operation 512 during the procedure performed as shown in FIG. 5 may include information about a trigger that meets a condition (e.g., "change of allowed slice" policy control request trigger), or new slice information (e.g., new Allowed NSSAI).

During the procedure performed as shown in FIG. 5, the updated policy (DNN replacement or SMF selection management) determined by the PCF 140 in operation 514 may include an updated List of S-NSSAIs or Per S-NSSAI: List of DNNs, and the List of S-NSSAIs or Per S-NSSAI: List of DNNs may be determined based on the slice information (e.g., Allowed NSSAI) received from the AMF 120 in operation 512. The updated List of S-NSSAIs or the updated Per S-NSSAI: List of DNNs may be S-NSSAIs included in the slice information (e.g., Allowed NSSAI) received from the AMF 120 in operation 512.

For example, when the Allowed NSSAI in operation 222 is different from the Allowed NSSAI in operation 512, it may lead to a possibility that the list of S-NSSAIs determined by the PCF 140 in operation 224 is different from the list of S-NSSAIs determined by the PCF 140 in operation 514. In operation 514, the PCF 140 may change the List of S-NSSAIs determined in operation 224 of FIG. 2 to fit to the Allowed NSSAI received in operation 512. For example, in operation 514, the PCF 140 may delete one or more S-NSSAIs included in the List of S-NSSAIs determined in operation 224 of FIG. 2, when the one or more S-NSSAIs are not included in the Allowed NSSAI received in operation 512. Furthermore, in operation 514, the PCF 140 may add one or more S-NSSAIs that are not included in the List of S-NSSAIs determined in operation 224 of FIG. 2, when the one or more S-NSSAIs are included in the Allowed NSSAI received in operation 512.

Or, for example, the PCF 140 may delete the List of DNNs determined in operation 224 of FIG. 2, when associated S-NSSAI among the List of DNNs is not included in the Allowed NSSAI received in operation 512. The PCF 140 may determine a List of DNNs for an S-NSSAI newly added to the Allowed NSSAI received in operation 512.

In an embodiment of the disclosure, the Npcf_AMPolicyControl_Update response message transmitted by the PCF 140 to the AMF 120 in operation 516 during the procedure performed as shown in FIG. 5 may include new policy information (e.g., SMF selection management, DNN replacement trigger information, or the like) changed in operation 514. The AMF 120 may store the received information, and apply the policy.

In an embodiment of the disclosure, during the procedure performed as shown in FIG. 5, in operation 518, the AMF 120 may apply the updated policy information to a PDU session request not yet established (e.g., a PDU session request before the SMF 135 has not yet been selected to handle the PDU session request). For example, the updated policy information may not be applied to the established PDU session and may not be involved with operation of the established PDU session.

Figure 7:
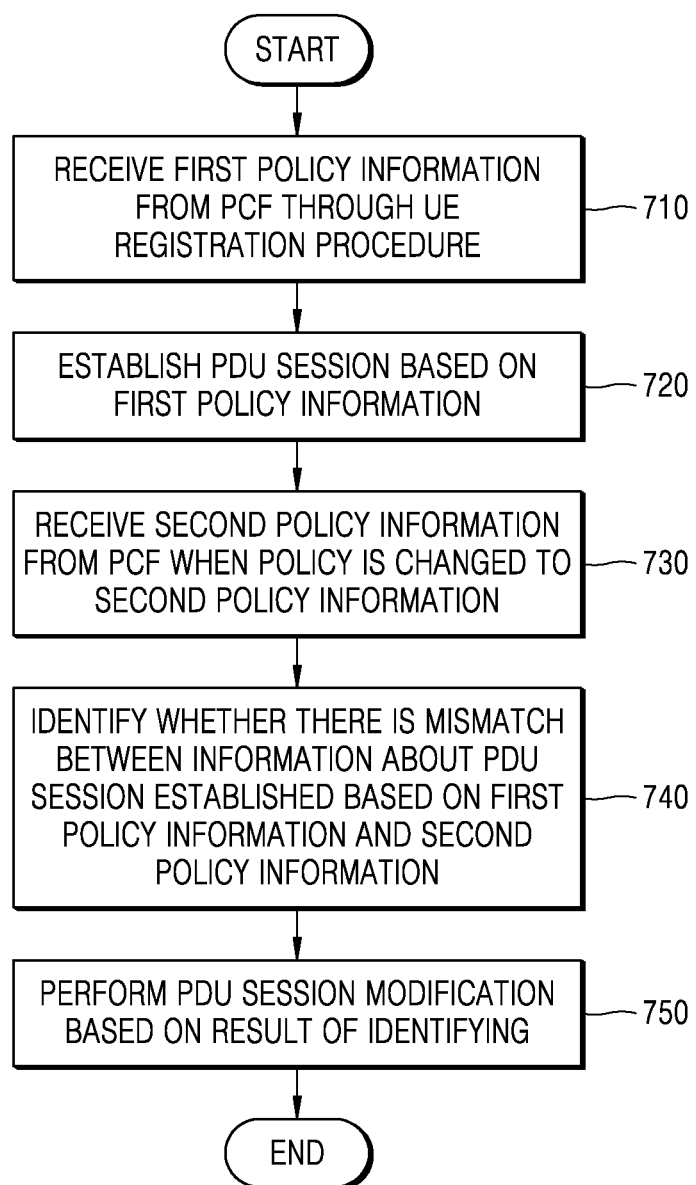
FIG. 7 is a flowchart illustrating an AMF operation method, according to an embodiment of the disclosure.

FIG. 7 is a flowchart illustrating an AMF operation method, according to an embodiment of the disclosure.

Referring to FIG. 7, in operation 710, the AMF 120 may receive first policy information from the PCF 140 through a UE registration procedure. In an embodiment of the disclosure, the UE registration procedure may refer to the UE registration procedure as shown in FIG. 2. For example, the UE registration procedure may include operations 222 to 226 of FIG. 2. In an embodiment of the disclosure, the first policy information may refer to information included in the message transmitted by the PCF 140 to the AMF 120 in operation 226 of FIG. 2. For example, the first policy information may include DNN replacement trigger information determined by the PCF 140. In an embodiment of the disclosure, the DNN replacement trigger information may include DNN replacement of unsupported DNNs, List of S-NSSAIs, List of DNNs, or the like.

In operation 720, the AMF 120 may establish a PDU session based on the first policy information. In an embodiment of the disclosure, the PDU session establishment procedure may refer to the PDU session establishment procedure shown in FIG. 3. For example, the PDU session establishment procedure may include operations 312 to 318 of FIG. 3. In an embodiment of the disclosure, a response message received by the AMF 120 from the PCF 140 through the PDU session establishment procedure may include a selected DNN determined by the PCF 140.

In operation 730, the AMF 120 may receive changed second policy information from the PCF 140 when a policy change to the second policy information is determined. In an embodiment of the disclosure, the policy change to the second policy information may be determined by the AMF 120 or the PCF 140. For example, in operation 410 of FIG. 4, the PCF 140 that has established AM policy association setup with the AMF 120 may determine that a new policy is required. Or, in operation 510 of FIG. 5, the AMF 120 that has established AM policy association setup with the PCF 140 may determine that a new policy is required. In operation 412 of FIG. 4 or in operation 514 of FIG. 5, a policy may be determined by the PCF 140. The AMF 120 may receive the second policy information determined from the PCF 140.

In operation 740, the AMF 120 may identify whether there is a mismatch between information about the PDU session established based on the first policy information and the second policy information. For example, the AMF 120 may identify whether there is a mismatch between PDU session context/status set up based on the first policy information and the second policy information. For example, the AMF 120 may identify whether a DNN (e.g., DNN B) indicated by the first policy information is matched with a DNN (e.g., DNN C) indicated by the second policy information. In this case, the DNN indicated by the first policy information and the DNN indicated by the second policy information may be a subject to which the requested DNN (e.g., DNN A) requested by the UE 100 is changed.

In operation 750, the AMF 120 may perform PDU session modification based on a result of the identifying. In an embodiment of the disclosure, the first policy information or the second policy information may include an indication about a PDU session handling method of the AMF 120 on an occasion when there is a mismatch between the information about the PDU session established based on the first policy information and the second policy information. When there is the mismatch between the information about the PDU session established based on the first policy information and the second policy information, the AMF 120 may perform PDU session modification based on the indication about the PDU session handling method included in the first policy information or the second policy information.

In an embodiment of the disclosure, the PDU session handling method may include the AMF 120 maintaining the PDU session established based on the first policy information and applying the second policy information only to a new PDU session request.

Or, in an embodiment of the disclosure, the PDU session handling method may include the AMF 120 releasing the PDU session established based on the first policy information, or maintaining the PDU session established based on the first policy information but releasing the PDU session when the PDU session is deactivated.

Or, in an embodiment of the disclosure, the PDU session handling method may be set up in advance in a local policy of the AMF 120.

In an embodiment of the disclosure, performing the PDU session modification based on a result of the identifying may include transmitting a request message to the SMF 135 to update the DNN of the PDU session established based on the first policy information. The request message may include a DNN requested by the UE 100, a DNN of the established PDU session, a DNN indicated by the second policy information, or a context identifier for the DNN of the established PDU session. The AMF 120 may receive from the SMF 135 a response message indicating whether to change the DNN of the established PDU session to the DNN indicated by the second policy information.

As shown in FIG. 7, the AMF 120 may perform PDU session modification when there is a mismatch between the information about the PDU session established based on the first policy information and the second policy information.

Even though there is the mismatch, the SMF 135 may determine not to change the DNN of the PDU session established based on the first policy information to the DNN indicated by the second policy information. In this regard, FIG. 8 shows operation of the AMF 120 when the change of DNN is not possible.

Figure 8:
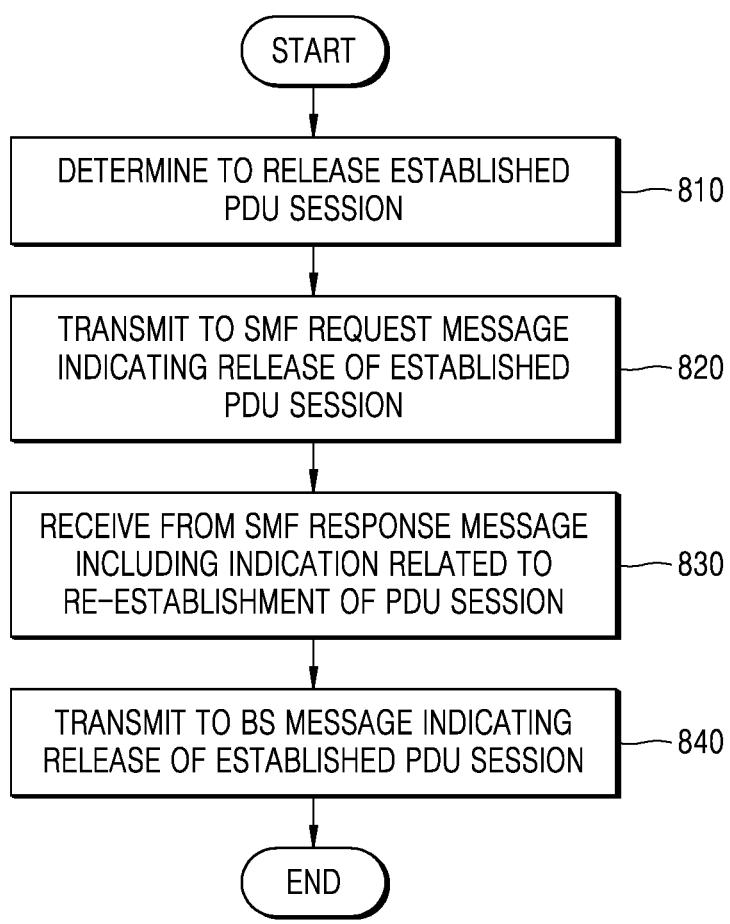
FIG. 8 is a flowchart illustrating an AMF operation method to perform a PDU session release procedure, according to an embodiment of the disclosure.

FIG. 8 is a flowchart illustrating an AMF operation method to perform a PDU session release procedure, according to an embodiment of the disclosure.

Referring to FIG. 8, in operation 810, the AMF 120 may determine to release the established PDU session. For example, when a response message transmitted to the AMF 120 from the SMF 135 indicates that the DNN (e.g., DNN B) of the PDU session established based on the first policy information may not be changed to the DNN (e.g., DNN C) indicated by the second policy information, the AMF 120 may determine to release the PDU session established based on the first policy information.

In operation 820, the AMF 120 may transmit to the SMF 135 a request message indicating release of the established PDU session. In an embodiment of the disclosure, the request message indicating the release of the established PDU session may include an SM context ID indicating the PDU session to be released, a release indication, information about a cause for the release or an operation type, or the like.

In operation 830, the AMF 120 may receive from the SMF 135 a response message including an indication related to re-establishment of a PDU session. In an embodiment of the disclosure, the response message including the indication related to re-establishment of the PDU session may include a result indication, information about a cause, a cause value, or an N1N2 SM container. The AMF 120 may receive from the SMF 135 the response message including an indication related to re-establishment of the PDU session, and may know that the PDU session has been released.

In operation 840, the AMF 120 may transmit to the BS 110 a message indicating the release of the established PDU session. In an embodiment of the disclosure, the message indicating the release of the established PDU session may refer to an N2 resource release request message. The N2 resource release request message may include PDU session release command information.

As shown in FIG. 8, the AMF 120 may perform a PDU session release procedure when the change to a new DNN is not supported by the SMF 135.

An operation method of an AMF in a wireless communication system includes: receiving first policy information from a PCF through a UE registration procedure; establishing a PDU session, based on the received first policy information; receiving second policy information from the PCF when a change of policy from the first policy information to the second policy information is determined by the AMF or the PCF; identifying whether there is a mismatch between information about the PDU session established based on the first policy information and the second policy information; and performing modification of the PDU session, based on a result of the identifying.

The second policy information may include an indication about a PDU session handling method of the AMF on an occasion when there is the mismatch between the information about the PDU session established based on the first policy information and the second policy information.

The performing of the modification of the PDU session based on the result of the identifying may include modifying the PDU session based on the indication about the PDU session handling method of the AMF included in the second policy information, when there is the mismatch between the information about the PDU session established based on the first policy information and the second policy information.

The PDU session handling method may include maintaining the PDU session established based on the first policy information, and applying the second policy information only to a new PDU session request.

The PDU session handling method may include releasing the PDU session established based on the first policy information, or releasing the PDU session established based on the first policy information when the PDU session is deactivated while the PDU session established based on the first policy information is maintained.

The PDU session handling method may be set up in advance in a local policy of the AMF.

The performing of the modification of the PDU session based on the result of the identifying may include transmitting, to an SMF, a request message for updating a DNN of the PDU session established based on the first policy information, wherein the request message may include at least one of a DNN requested by the UE, a DNN of the established PDU session, a DNN indicated by the second policy information, or a context identifier for the DNN of the established PDU session.

The operation method may further include receiving, from the SMF, a response message indicating whether to change the DNN of the established PDU session to the DNN indicated by the second policy information.

The operation method may further include, when the response message indicates that the change of the DNN of the established PDU session to the DNN indicated by the second policy information is not possible, determining to release the established PDU session; transmitting, to the SMF, a request message indicating release of the established PDU session; receiving, from the SMF, a response message including an indication related to re-establishment of a PDU session; and transmitting, to a base station, a message indicating release of the established PDU session.

The operation method may further include selecting a DNN to replace a DNN requested by the UE, based on the first policy information, wherein the first policy information may include at least one of information about a DNN used instead of an unsupported DNN, information about a DNN used with S-NSSAI, or information about a DNN used instead of a DNN requested by the UE.

An AMF in a wireless communication system includes: a transceiver; and at least one processor configured to receive first policy information from a PCF through a UE registration procedure, establish a PDU session based on the received first policy information, receive second policy information from the PCF when a change of policy from the first policy information to the second policy information is determined by the AMF or the PCF, identify whether there is a mismatch between information about the PDU session established based on the first policy information and the second policy information, and perform modification of the PDU session, based on a result of the identifying.

The second policy information may include an indication about a PDU session handling method of the AMF on an occasion when there is the mismatch between the information about the PDU session established based on the first policy information and the second policy information.

The at least one processor may be further configured to modify the PDU session based on the indication about the PDU session handling method of the AMF included in the second policy information, when there is the mismatch between the information about the PDU session established based on the first policy information and the second policy information.

The PDU session handling method may include maintaining the PDU session established based on the first policy information and applying the second policy information only to a new PDU session request.

The PDU session handling method may include releasing the PDU session established based on the first policy information, or releasing the PDU session established based on the first policy information when the PDU session is deactivated while the PDU session established based on the first policy information is maintained.

The PDU session handling method may be set up in advance in a local policy of the AMF.

The at least one processor may be further configured to transmit, to an SMF, a request message for updating a DNN of the PDU session established based on the first policy information, wherein the request message may include at least one of a DNN requested by the UE, a DNN of the established PDU session, a DNN indicated by the second policy information, or a context identifier for the DNN of the established PDU session.

The at least one processor may be further configured to receive, from the SMF, a response message indicating whether to change the DNN of the established PDU session to the DNN indicated by the second policy information.

The at least one processor may be further configured to, when the response message indicates that the change of the DNN of the established PDU session to the DNN indicated by the second policy information is not possible, determine to release the established PDU session, transmit, to the SMF, a request message indicating release of the established PDU session, receive, from the SMF, a response message including an indication related to re-establishment of a PDU session, and transmit, to a base station, a message indicating release of the established PDU session.

The at least one processor may be further configured to select a DNN to replace a DNN requested by the UE, based on the first policy information, wherein the first policy information may include at least one of information about a DNN used instead of an unsupported DNN, information about a DNN used with S-NSSAI, or information about a DNN used instead of a DNN requested by the UE.

Figure 9:
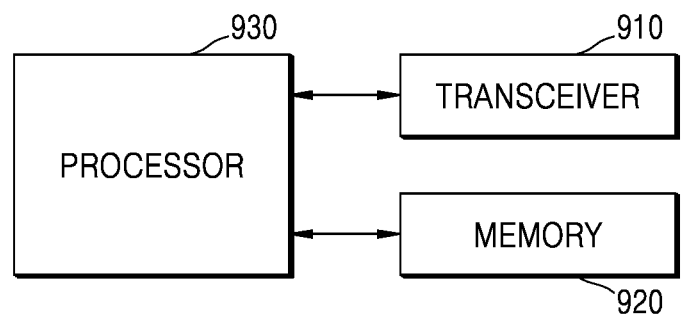
FIG. 9 is a block diagram of a UE, according to an embodiment of the disclosure.

FIG. 9 is a block diagram of a UE, according to an embodiment of the disclosure.

Referring to FIG. 9, the UE 100 may include a transceiver 910, a memory 920, and a processor 930. Elements of the UE 100 are not, however, limited thereto. For example, the UE 100 may include more or fewer elements than described above. In addition, the transceiver 910, the memory 920, and the processor 930 may be implemented in a single chip.

In an embodiment of the disclosure, the processor 930 may control a series of processes for the UE 100 to be operated according to the embodiments of the disclosure. For example, the processor 930 may control the components of the UE 100 to provide a service requested by the UE 100 in a wireless communication system according to embodiments of the disclosure. The processor 930 may be provided in the plural, which may perform operation for providing the service by carrying out a program stored in the memory 920.

The transceiver 910 may transmit or receive signals to or from a BS. The signals to be transmitted to or received from the BS may include control information and data. The transceiver 910 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 910 are not limited to the RF transmitter and RF receiver. In addition, the transceiver 910 may receive a signal on a wireless channel and output the signal to the processor 930, or transmit a signal output from the processor 930 on a wireless channel.

In an embodiment of the disclosure, the memory 920 may store a program and data required for operation of the UE 100. Furthermore, the memory 920 may store control information or data included in a signal transmitted or received by the UE 100. The memory 920 may include a storage medium such as a read only memory (ROM), a random access memory (RAM), a hard disk, a compact disk ROM (CD-ROM), and a digital versatile disc (DVD), or a combination of storage mediums. Moreover, the memory 920 may be provided in the plural. In an embodiment, the memory 920 may store a program to perform a method of providing a service requested by the UE 100 in a wireless communication system as described above.

Figure 10:
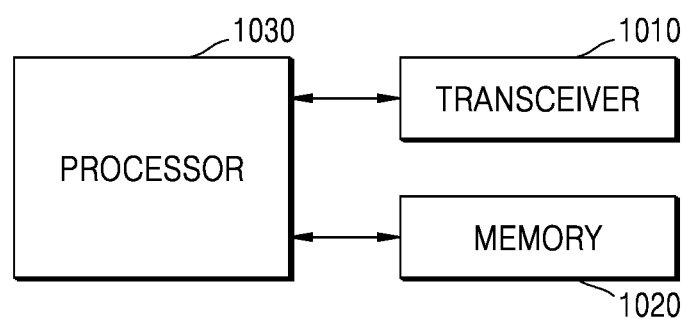
FIG. 10 is a block diagram of a core network object, according to an embodiment of the disclosure.

FIG. 10 is a block diagram of a core network object in a wireless communication system, according to an embodiment of the disclosure.

"Unit", "module", "block", etc., used herein each represent a unit for handling at least one function or operation, and may be implemented in hardware, software, or a combination thereof. In an embodiment of the disclosure, the core network object may include the AMF 120, the SMF 135, or the PCF 140, without being limited thereto.

Referring to FIG. 10, the core network object may include a transceiver 1010, a memory 1020, and a processor 1030.

The transceiver 1010 may provide an interface for communicating with other devices in the network. Specifically, the transceiver 1010 may convert a bitstream to be transmitted to another device from the core network object into a physical signal and convert a physical signal received from the other device into a bitstream. That is, the transceiver 1010 may transmit or receive a signal. Hence, the transceiver 1010 may also be referred to as a modem, a transmitter, a receiver, a communication unit, or a communication module. In this case, the transceiver 1010 may allow the core network object to communicate with other devices or systems through backhaul connection (e.g., wired backhaul or wireless backhaul) or other connection methods, or over a network.

The memory 1020 may store a basic program for operation of the core network object, an application program, and data such as settings information. The memory 1020 may include a volatile memory, a non-volatile memory, or a combination of the volatile memory and the non-volatile memory. The memory 1020 may also provide the stored data at the request of the processor 1030.

The processor 1030 may control general operation of the core network object. For example, the processor 1030 may transmit or receive a signal through the transceiver 1010. The processor 1030 may record data to the memory 1020 or read out data from the memory 1020. For this, there may be at least one processor 1030. The processor 1030 may control the core network object to operate according to an embodiment of the disclosure as will be described below. For example, the processor 1030 may control components of the core network object to perform the method of providing a service requested by the UE 100 according to the disclosure.

Figure 11:
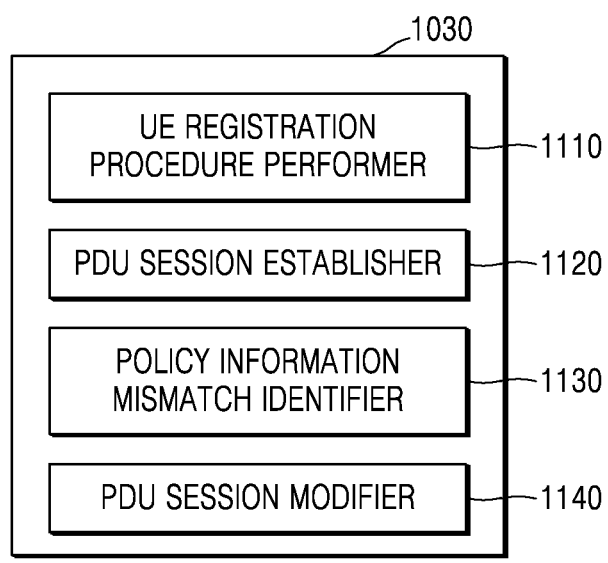
FIG. 11 is a block diagram of a processor of a core network object, according to an embodiment of the disclosure.

FIG. 11 is a block diagram of a processor of a core network object, according to an embodiment of the disclosure. For example, FIG. 11 shows a configuration of the processor 1030 of FIG. 10.

Referring to FIG. 11, when the core network object is the AMF 120, the processor 1030 may include the components shown in FIG. 11 to perform the embodiments of the disclosure. For example, the processor 1030 may include a UE registration procedure performer 1110, a PDU session establisher 1120, a policy information mismatch identifier 1130, and a PDU session modifier 1140.

These components included in the processor 1030, e.g., the UE registration procedure performer 1110, the PDU session establisher 1120, the policy information mismatch identifier 1130, and the PDU session modifier 1140, may be hardware components or software components. When the components are implemented in software, they may be implemented in the form of software modules. Not all but some of the aforementioned components may be included in the processor 1030.

In an embodiment of the disclosure, the UE registration procedure performer 1110 may perform a UE registration procedure as shown in FIG. 2. In addition, the UE registration procedure performer 1110 may receive first policy information from the PCF 140 through the UE registration procedure.

In an embodiment of the disclosure, the PDU session establisher 1120 may establish a PDU session based on the first policy information. For example, PDU session establishment may be performed as shown in FIG. 3.

In an embodiment of the disclosure, the policy information mismatch identifier 1130 may identify whether there is a mismatch between information about the PDU session established based on the first policy information and the second policy information. The second policy information may be received by the AMF 120 from the PCF 140 when a change of policy from the first policy information to the second policy information is determined by the AMF 120 or the PCF 140.

In an embodiment of the disclosure, the PDU session modifier 1140 may perform PDU session modification based on a result of identifying the mismatch between the policies. For example, when there is the mismatch between the information about the PDU session established based on the first policy information and the second policy information, the PDU session modifier 1140 may modify the PDU session based on an indication about a PDU session handling method of the AMF 120 included in the second policy information.

Methods according to the claims of the disclosure or the embodiments of the disclosure described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the disclosure, the term 'computer program product' or 'computer-readable recording medium' is used to generally indicate a medium such as a memory, a hard disc installed in a hard disc drive, and a signal. The computer program product or computer-readable recording medium is a means provided for the method of providing a service according to the disclosure.

Embodiments of the disclosure provide an apparatus and method capable of effectively providing a service in a wireless communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a wireless communication, the method comprising:
    transmitting, to a policy control function (PCF), a policy create request message including an allowed network slice selection assistance information (NSSAI);
    receiving, from the PCF, a policy create response message including first session management function (SMF) selection management information and information on a policy control request trigger including change of the allowed NSSAI;
    identifying whether the allowed NSSAI is changed;
    in case that the allowed NSSAI is changed, transmitting, to the PCF, a policy update request message including a new allowed NSSAI; and
    receiving, from the PCF, a policy update response message including second SMF selection management information, wherein the second SMF selection management information is applied to a new protocol data unit (PDU) session only except already established PDU session.

2. The method of claim 1, wherein the policy create response message further includes at least one of List of S-NSSAIs and Per S-NSSAI: list of Data Network Names (DNNs).

3. A method performed by a policy control function (PCF) in a wireless communication, the method comprising:
    receiving, from an access and mobility management function (AMF), a policy create request message including allowed network slice selection assistance information (NSSAI);
    transmitting, to the AMF, a policy create response message including first session management function (SMF) selection management information and information on a policy control request trigger including change of the allowed NSSAI;
    in case that the allowed NSSAI is changed, receiving, from the AMF, a policy update request message including a new allowed NSSAI; and
    transmitting, to the AMF, a policy update response message including second SMF selection management information, wherein the second SMF selection management information is applied to a new protocol data unit (PDU) session only except already established PDU session.

4. The method of claim 3, wherein the policy create response message further includes at least one of List of S-NSSAIs and Per S-NSSAI: list of Data Network Names (DNNs).

5. An access and mobility management function (AMF) in a wireless communication, the AMF comprising:
    a transceiver; and
    at least one processor configured to:
    transmit, to a policy control function (PCF), a policy create request message including an allowed network slice selection assistance information (NSSAI);
    receive, from the PCF, a policy create response message including first session management function (SMF) selection management information and information on a policy control request trigger including change of the allowed NSSAI;
    identify whether the allowed NSSAI is changed;
    in case that the allowed NSSAI is changed, transmit, to the PCF, a policy update request message including a new allowed NSSAI; and
    receive, from the PCF, a policy update response message including second SMF selection management information, wherein the second SMF selection management information is applied to a new protocol data unit (PDU) session only except already established PDU session.

6. The AMF of claim 5, wherein the policy create response message further includes at least one of List of S-NSSAIs and Per S-NSSAI: list of Data Network Names (DNNs).

7. The AMF of claim 5, wherein the AMF is selected by a base station based on the allowed NSSAI.

8. The AMF of claim 5, wherein the at least one processor is further configured to:
    select the PCF based on at least one of information received from a user equipment (UE), information received from a unified data management (UDM) device, or a local policy of the AMF.

9. The AMF of claim 8, wherein the PCF is configured to support a data network name (DNN) replacement function.

* * * * *